United States Patent [19]

Fan et al.

[11] 3,970,582
[45] July 20, 1976

[54] ALPHA BARIUM ZINC CADMIUM SULFIDE PHOSPHORS AND METHOD

[75] Inventors: Albert K. Fan, Hackettstown; Melvin Tecotzky, Mendham, both of N.J.

[73] Assignee: United States Radium Corporation, Morristown, N.J.

[22] Filed: Dec. 4, 1975

[21] Appl. No.: 637,840

Related U.S. Application Data

[63] Continuation-in-part of Ser. No. 448,621, March 6, 1974, abandoned.

[52] U.S. Cl. .......................................... 252/301.6 S
[51] Int. Cl.² .......................................... C09K 11/46
[58] Field of Search .............................. 252/301.6 S

[56] References Cited
UNITED STATES PATENTS

| | | | |
|---|---|---|---|
| 2,614,082 | 10/1952 | Smith | 252/301.6 S |
| 3,454,715 | 7/1969 | Larach et al. | 252/301.6 S X |
| 3,602,753 | 8/1974 | Evans et al. | 252/301.6 S X |

OTHER PUBLICATIONS

Malur, "Zeitschrift fur Chemie", vol. 5, No. 10, 1965, p. 399.

Schmering et al., "Z. Amorg. Allgem, Chem.," 312, pp. 99–109.

Kroger, "Some Aspects of the Luminescence of Solids", 1948, Elsevier Pub. Co. pp. 271, 276, 289, 291, 297.

Primary Examiner—Jack Cooper
Attorney, Agent, or Firm—Pennie & Edmonds

[57] ABSTRACT

New phosphors which may be activated to luminesce in the red to green portion of the spectrum have an alpha crystal structure isostructural with $Ba_2MnS_3$ and the composition $$Ba_2Zn_{1-y}Cd_yS_3 : A_w \cdot zZnS$$

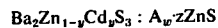

wherein A is an activator element selected from the group consisting of manganese, europium, cerium, lead and terbium, y is a numerical value in the range from 0 to 1, z is a numerical value in the range from 0 to 20, and w is a numerical value in the range from 0.00001 to 0.1. Methods of making these phosphors are described.

9 Claims, No Drawings

ALPHA BARIUM ZINC CADMIUM SULFIDE PHOSPHORS AND METHOD

This application is a continuation-in-part of application Ser. No. 448,621, filed Mar. 6, 1974, now abandoned.

FIELD OF THE INVENTION

This invention relates to new luminescent materials (phosphors) which emit light when exposed to ultraviolet, electron or X-ray radiation. The new phosphors are basically alpha barium zinc sulfides or barium zinc cadmium sulfides activated with manganese, europium, cerium, lead or terbium.

The invention further relates to a method for making the new phosphors.

BACKGROUND OF THE INVENTION

Zinc sulfide and zinc cadmium sulfide phosphors are well known and have been used commercially for many years. Such phosphors activated with silver or copper are commonly used as the green phosphor in color television cathode ray tubes. Zinc cadmium sulfide phosphors activated with manganese also are known.

Alkaline earth sulfide phosphors, activated with a variety of elements, have been reported ("Some Aspects of the Luminescence of Solids", by Kroger, Elsevier Publishing Co., Inc., 1948), but have not found substantial commercial use. Barium zinc sulfide has been previously reported as a chemical compound by Schnering and Hoppe in Z. Anorg u. Allgem Chem., 312, p. 99 (1961), and Malur, Z. fur Chemie, 5, p. 399 (1965). However, the compound reported by these investigators is different from the novel compound to which this invention relates. The earlier investigators reported on a $Ba_2ZnS_3$ species which crystallized in the beta form crystal structure. The compounds claimed in this patent application are different materials in that they crystallize in the alpha form structure and exhibit different luminescent properties. The discovery of this new crystal form for $Ba_2ZnS_3$ is completely unexpected from what has been reported in the literature.

The most satisfactory red-emitting phosphors for cathode ray tube use are the rare earth phosphors, especially the rare earth oxides and oxysulfides such as yttrium oxysulfide or yttrium oxide, both activated with europium, and gadolinium oxide activated with europium Yttrium vanadate activated with europium has also been used successfully. The rare earth phosphors are all relatively expensive and no relatively inexpensive red-emitting phosphors have thus far been developed which can equal them in cathode ray tube use.

STATEMENT OF THE INVENTION

The invention provides a phosphor having the structure and composition alpha $Ba_2Zn_{1-y}Cd_yS_3 : A_w \cdot zZnS$ wherein A is an activator element selected from the group consisting of manganese, europium, cerium, lead and terbium, $y$ is a numerical value from 0 to 1; $z$ is a numerical value from 0 to 20, and $w$ is a numerical value from 0.00001 to 0.1. For many purposes the phosphors may be cadmium-free (i.e., $y=0$); and generally advantageous values for $w$ are from 0.0001 to 0.01. Red-emitting phosphors are formed when the host is cadmium-free and the activator is manganese or europium, and green-emitting phosphors are formed when the host is cadmium-free and the activator is cerium, lead or terbium. Emission at intermediate colors may be secured by adjustment of the host composition and to some extent by control of activator concentration and of the condition under which the phosphor is produced.

The new phosphors are made in accordance with the invention by preparing a mixture of the host composition $Ba_2Zn_{1-y}Cd_yS_3$ and an activator compound. When $y=0$ (no cadmium) the cubic form of zinc sulfide is used. When cadmium is present either cubic or hexagonal zinc sulfide may be used. The activator compound is selected from the class consisting of carbonates, oxides, nitrates, sulfates, halides, acetates, and sulfides of the desired activator element in the proportions of one atom part of the host composition to an amount of the activator compound containing from 0.00001 to 0.1 atom part of the activator element, heating such mixture in a non-oxidizing atmosphere at a temperature in the range from 600° to 1000°C. for a time between 0.5 and 30 hours, and then cooling the product to room temperature. Often it is advantageous to grind or mill the cooled product and then again to fire it at a temperature in the range from 600° to 1000°C. for a time between 0.5 and 30 hours in a non-oxidizing atmosphere. The host composition may be added as such to the mixture, or it may be formed therein by mixing with the activator compound, in the desired proportions, sulfides of barium, zinc, and if desired cadmium, or other suitable reactants supplying these elements.

DESCRIPTION OF THE INVENTION

We have discovered that there are two crystal forms of $Ba_2ZnS_3$ compounds. The heretofor unknown low temperature form which we have discovered is alpha $Ba_2ZnS_3$. This form is obtained by preparing the compound under a charcoal environment at 800°C. to 1000°C. using the cubic form of zinc sulfide as the starting material. This new alpha $Ba_2ZnS_3$ is isostructural to $Ba_2CdS_3$ and $Ba_2MnS_3$. It belongs to the orthorhombic crystal system and space group Pnma, with the approximate cell parameters $a=9A$, $b=4A$ and $C=17A$. The older, previously reported beta form of $Ba_2ZnS_3$ is isostructural with $Ba_2FeS_3$ and $Ba_2CoS_3$. It has different cell parameters, i.e. $a=12.05A$, $b=4.21A$ and $c=12.65A$. We have found that the new alpha $Ba_2ZnS_3$: A forms brighter phosphors which emit at higher energy than the beta form $Ba_2ZnS_3$: A. The barium cadmium sulfide phosphors exist only in the alpha form.

The alpha barium zinc cadmium sulfide phosphors of the present invention are cathodoluminescent, x-ray luminescent, and photoluminescent, and exhibit a wide range of emission colors over half of the visible spectrum (from green to red), with individual emission color being dependent upon the particular selection of host and activator material and, in some cases, activator concentration. In the discussion herein of the barium zinc cadmium sulfide phosphors, all emission characteristics are for ultraviolet excitation unless otherwise stated, but it should be noted that each phosphor's cathodoluminescent emission color and x-ray luminescent emission color is similar to its photoluminescent emission color.

The divalent manganese-activated barium zinc sulfide (alpha $Ba_2ZnS_3$ : Mn) and its solid solution with barium cadmium sulfide ($Ba_2Zn_{1-y}Cd_yS_3$ : Mn) exhibits red emission. A preferred range of manganese concentration for these phosphors is 0.005% to 0.1% by weight. The emission color of these phosphors does not vary substantially with the manganese concentration. However, intermediate colors between orange and red are obtained by variation of the zinc to cadmium ratio. For example, the phosphor alpha $Ba_2ZnS_3$ : $Mn_{.004}$ has a red emission at 607 nm and is brighter than the high temperature beta form previously reported.

The manganese activated alpha barium zinc sulfide phosphor of the present invention is a suitable phosphor for the red component of a color television picture tube. For example, the phosphor alpha $Ba_2ZnS_3$ : $Mn_{0.004}$ · 1.5ZnS, when excited by electrons, emits bright red light having an emission peak at 607 nanometers. This phosphor has color coordinates of $x = 0.636$, $y = 0.359$, and a relative brightness 154% of the current commercially used rare earth oxysulfide (e.g., $Y_2O_2S$ : Eu) phosphors when measured in a demountable cathode ray tube using 15 KV. Such advantageous efficiency, and the low cost in comparison with the current rare earth red phosphors, makes this and other phosphors of this invention highy desirable for use in color television tubes.

The europium activated alpha barium zinc sulfides, like their manganese activated counterparts, exhibit a red emission color. For example, the phosphor alpha $Ba_2ZnS_3$ : $Eu_{0.0015}$ appears deep red and has an emission peak at about 626 nanometers. This is similar to the europium activated alkaline earth sulfides. The cerium and lead activated alpha barium zinc sulfides exhibit green emission when excited with ultraviolet and electrons. For example, the phosphors alpha $Ba_2ZnS_3$ : $Ce_{.0001}$ and alpha $Ba_2ZnS_3$ : $Pb_{.0001}$ have a green emission when excited by either ultraviolet or cathode ray radiation.

The photoluminescent properties of the new phosphor makes them highly desirable fluorescent pigments. The high atomic number of Ba also makes its use as an x-ray phosphor possible.

The new phosphors are generally prepared in two steps: (1) preparing a batch of the constituents, and then (2) heating the batch at a temperature from 600°C., or preferably 800°C., to 1000°C. to produce the phosphor. The first step may be carried out in any way that provides a uniform and intimate mixture of the constituents of the phosphor. For example, the constituents of the host material may be introduced in various ways. Sulfur, zinc, and cadmium may be introduced in elemental form and heated at 800°C. to 1000°C. to form cubic zinc sulfide, cadmium sulfide, or zinc cadmium mixed sulfide first, and the product may then be reacted with a barium sulfide. Or, the alpha $Ba_2ZnS_3$ or alpha $Ba_2Cd_yZn_{1-y}S_3$ may be formed in one step by including barium compounds in the reaction mixture. The barium may be introduced as barium sulfide or sulfate. Other oxygen-containing compounds of barium, zinc and cadmium, may also be used as the starting materials and may be converted to the respective sulfides with $H_2S$. It is desirable that the constituents of the host material be prepared in fine powder form. The activators may be introduced, for example, as carbonates, oxides, nitrates, sulfates, acetates, halides, or sulfides, and intimately mixed with one of the binary sulfides, or with the host material. When using a cerium or terbium compound to provide the activator, a like quantity of a corresponding compound of sodium or equivalent monovalent non-activator element is added to provide for charge compensation, as is customary in the art of preparing phosphors.

The second step involves reacting the mixtures of host material and activator compound to form a phosphor free of oxygen contamination. To achieve this, the mixture is heated in a nonoxidizing atmosphere at temperatures between 600° and 1000°C. for between 0.5 and 30 hours. Preferably, the batch is heated in the presence of activated charcoal for between 0.5 to 5 hours at between 750° to 950°C. when only binary sulfides are used as starting materials; or the batch is heated in an atmosphere containing hydrogen sulfide or hydrogen (e.g., formed by reacting wet charcoal) for between 1 and 20 hours at between 800° and 1000°C. when barium is added as the sulfate or other oxycompound. The optimum heat treatment, that is, the combination of heating time and reaction temperature for a particular batch, is determined empirically and is dependent in part on the composition of the phosphor reaction product. The temperature of heat treatment is generally lower as the cadmium content increases. Longer heating times are effective in eliminating any oxygen that is present in the batch. When the firing is completed, the phosphor reaction product is cooled to room temperature in the absence of oxygen, and is then ready for use as a phosphor.

To improve homogeneity, the reaction product may be ground in a ball mill and fired one or more times. Such additional firings are advantageous also at a temperature in the range from 600° to 1000°C and for a time from 0.5 to 30 hours.

EXAMPLE I

To a mixture of 6.78g of BaS and 1.95g of cubic ZnS was added 0.023g of $MnCO_3$. The mixture was dry blended in a shaker and then fired in a crucible surrounded by charcoal to form an oxygen-free reducing atmosphere. Firing was at about 800°C. for about three hours, and then the resultant phosphor reaction product was cooled to room temperature. The reaction product was a phosphor having an alpha crystal structure and the approximate calculated composition $Ba_2ZnS_3$ : $Mn_{.0002}$. It displayed a bright red cathodoluminescence and photoluminescence with the emission band centered at about 607 nanometers and with a bandwidth of about 46 nanometers.

EXAMPLE II

To a mixture of 6.78g of BaS, 0.97g of ZnS and 1.445g of CdS was added 23mg of $MnCO_3$ (with CdS present in the mixture, the ZnS could be either cubic or hexagonal in crystal form). The mixture was blended in a shaker for about 10 minutes and then fired in a crucible surrounded by charcoal (forming a reducing gas atmosphere containing CO) at about 800°C. for about 2 hours, then was cooled to room temperature. The product was cathodoluminescent, having a red emission band centered at 601 nanometers with about a 52 nanometer bandwidth. The calculated formula of this phosphor, which had an alpha crystal structure, was $Ba_2Zn_{.5}Cd_{.5}S_3$ : $Mn_{.0002}$.

EXAMPLE III

Four hundred grams of cubic ZnS and 1.788g of $MnCO_3$ were mixed with enough water to form a uniform slurry. This slurry was dried at 110°C. After drying it was ball milled to a fine powder, and 4.88g of this fine powder was then mixed with 6.78g BaS. The mixture was heated at about 800°C. in a crucible surrounded by charcoal, forming an oxygen free atmosphere, for about 2 hours. The resultant phosphor reaction product was then cooled to room temperature. The reaction product is a phosphor having the alpha crystal structure and the approximate calculated composition $Ba_2ZnS_3 : Mn_{.0005}$ 1.5ZnS. This phosphor exhibits a bright red cathodoluminescent emission band centered at about 607 nanometers with a bandwidth of about 57 nanometers. The relative brightness of this phosphor is about 154% of the commercially used rare earth oxysulfide ($Y_2 O_2S : Eu$) red phosphor.

EXAMPLES IV TO VII

The europium, cerium, lead, and terbium activated alpha barium zinc sulfides shown in Table I were all made in the same manner as the phosphor of Example I, except for the substitution of $MnCO_3$ by the oxides of the other activators shown in the product composition. The observed color and the approximate peak emission for each phosphor under ultraviolet and cathode ray excitation are indicated in Table I.

TABLE I

| Example No. | BaS (grams) | ZnS (grams) | Activator Compound Added | ppm of Activator | Product Composition | Observed Luminescent Color | Emission Peak Wavelength (nanometers) |
| --- | --- | --- | --- | --- | --- | --- | --- |
| IV | 6.78 | 1.95 | $Eu_2O_3$ | 5000 | $Ba_2ZnS_3$:Eu | Red | 626 |
| V | 6.78 | 1.95 | $Ce_2(SO_4)_3$ | 100 | $Ba_2ZnS_3$:Ce | Green | 502 |
| VI | 6.78 | 1.95 | $Tb_2(SO_4)_3$ | 2000 | $Ba_2ZnS_3$:Tb | Green | — |
| VII | 6.78 | 1.95 | $Pb(C_2H_3O_2)_2$ | 100 | $Ba_2ZnS_3$:Pb | Green | — |

EXAMPLE VIII

To a mixture of 10g $BaCO_3$ and 4.12g ZnO there was added 0.0246g $MnCO_3$. The mixture was blended dry in a shaker, and then fired in a hydrogen sulfide ($H_2S$) atmosphere for about two hours at a temperature of approximately 800°C. The fired product was allowed to cool at room temperature in a nitrogen atmosphere. The resulting reaction product was a phosphor having the same crystal structure, approximate composition, and luminescent properties as the phosphor of Example I.

EXAMPLE IX

The procedure of Example I is followed except that the $MnCO_3$ used therein is replaced, separately and in turn, by an equivalent amount of each of the following activators: manganese chloride, fluoride, and bromide; manganous sulfide; europium chloride, fluoride, and nitrate; cerous chloride; terbium chloride, fluoride, and nitrate; and lead sulfide, chloride, bromide, and iodide. In each case an alpha structure phosphor is obtained.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

We claim:

1. A phosphor having an alpha crystal structure isostructural with $Ba_2MnS_3$ and the chemical composition $$Ba_2Zn_{1-y}Cd_yS_3 : A_w \cdot zZnS$$

wherein A is an activator element selected from the group consisting of manganese, europium, cerium, lead and terbium, y is a numerical value in the range from 0 to 1, z is a numerical value in the range from 0 to 20, and w is a numerical value in the range from 0.00001 to 0.1.

2. A red-emitting alpha crystal structure phosphor according to claim 1 having the chemical composition $$Ba_2Zn_{1-y}Cd_yS_3 : Mn_w \cdot zZnS$$

3. A red-emitting alpha crystal structure phosphor according to claim 2 wherein y is 0.

4. A red-emitting alpha crystal structure phosphor according to claim 1 having the chemical composition $$Ba_2Zn_{1-y}Cd_yS_3 : Eu_w \cdot zZnS$$

5. A green-emitting alpha crystal structure phosphor according to claim 1 having the chemical composition $$Ba_2Zn_{1-y}Cd_yS_3 : Ce_w \cdot zZnS$$

6. A green-emitting alpha crystal structure phosphor according to claim 1 having the chemical composition $$Ba_2Zn_{1-y}Cd_yS_3 : Tb_w \cdot zZnS$$

7. A green-emitting alpha crystal structure phosphor according to claim 1 having the chemical composition $$Ba_2Zn_{1-y}Cd_yS_3 : Pb_w \cdot zZnS$$

8. The method of making an alpha crystal structure phosphor composition that is isostructural with $Ba_2MnS_3$ which comprises preparing a mixture of a host compound comprising $$\text{alpha } Ba_2Zn_{1-y}Cd_y S_3,$$

wherein y is a numerical value from 0 to 1, and an activator compound selected from the class consisting of carbonates, oxides, nitrates, sulfates, acetates, halides and sulfides of an activator element selected from the class consisting of manganese, europium, cerium, lead and terbium, in proportions of one atom part host compound to an amount of activator compound containing from 0.00001 to 0.1 atom part activator element, heating such mixture in a non-oxidizing atmosphere at a temperature in the range from 600° to 1000°C. for a time between 0.5 and 30 hours, and then cooling the product to room temperature.

9. The method according to claim 8 wherein the cooled product is ground and then is again heated at a temperature in the range from 600° to 1000°C. for a time between 0.5 and 30 hours in a non-oxidizing atmosphere.

* * * * *